US010939205B2

(12) United States Patent
Moon et al.

(10) Patent No.: US 10,939,205 B2
(45) Date of Patent: Mar. 2, 2021

(54) ECHO CANCELATION USING CONVOLUTIVE BLIND SOURCE SEPARATION

(71) Applicant: Utah State University, Logan, UT (US)

(72) Inventors: Todd K. Moon, Logan, UT (US); Jacob H. Gunther, Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 16/389,699

(22) Filed: Apr. 19, 2019

(65) Prior Publication Data

US 2019/0327557 A1 Oct. 24, 2019

Related U.S. Application Data

(60) Provisional application No. 62/660,115, filed on Apr. 19, 2018.

(51) Int. Cl.
*G06F 17/00* (2019.01)
*H04R 3/02* (2006.01)

(52) U.S. Cl.
CPC .................................... *H04R 3/02* (2013.01)

(58) Field of Classification Search
CPC ........................................................ H04R 3/02
USPC ............................................................ 700/94
See application file for complete search history.

(56) References Cited

U.S. PATENT DOCUMENTS

2003/0072362 A1* 4/2003 Awad ................. H03H 21/0012 375/232
2005/0008145 A1* 1/2005 Gunther ................ H04M 9/082 379/406.08

OTHER PUBLICATIONS

Moon et al., "Acoustic echo cancellation during doubletalk using convolutive blind source separation of signals having temporal difference", 2018 IEEE Statistical Signal Processing Workshop (SSP), Freiburg, Jun. 10, 2018, pp. 408-412.
Amari et al., "Multichannel blind deconvolution and equalization using the natural gradient," 1997 First IEEE Signal Processing Workshop on Signal Processing Advances in Wireless Communications, pp. 101-104, Apr. 1997.
Sun et al., "Multichannel blind deconvolution of arbitrary signals: adaptive algorithms and stability analyses," Conference Record of the Thirty-Fourth Asilomar Conference on Signals, Systems and Computers, vol. 2, pp. 1412-1416, Oct.-Nov. 2000.
Douglas et al., "Natural gradient multichannel blind deconvolution and source separation using casual fir filters," IEEE International Conference on Acoustics, Speech, and Signal Processing, vol. 5, pp. 477-480, May 2004.
Amari et al., "Gradient learning in structured parameter spaces: Adaptive blind separation of signal sources," Proceedings of World Congress on Neural Networks, pp. 950-956, 1996.

(Continued)

*Primary Examiner* — Paul C McCord

(57) ABSTRACT

For canceling acoustic echoing, a processor receives audio signals comprising a speaker output and an ambient input. The processor further calculates separated output signals from mixed signals using a separating transfer function. The processor calculates a criterion function based on the separated output signals. In addition, the processor calculates an acoustic echo transfer function based on maximizing the a criterion function. The processor separates a source signal from the audio signal using the acoustic echo transfer function.

11 Claims, 8 Drawing Sheets

(56) References Cited

OTHER PUBLICATIONS

Amari et al., "Novel on-line adaptive learning algorithms for blind deconvolution using the natural gradient approach," Proceedings of the 11th IEEE Symposium on System Identification, pp. 1057-1062, 1997.

Torkkola et al., "Blind separation of convolved sources based on information maximization," IEEE Workshop on Networks for Signal Processing, Kyoto Japan, pp. 423-432, 1996.

Torkkola et al., "Blind deconvolution, information maximization and recursive filters," in IEEE International Conference on Acoustics, Speech and Signal Processing, vol. 4, pp. 3301-3304, IEEE, Apr. 1997.

Torkkola et al., Unsupervised Adaptive Filtering, vol. 1, ch. Blind Separation of Delayed and Convolved Sources, 2000, pp. 321-376. Wiley Interscience.

Suneel et al., "Double talk acoustic echo cancellation by using adaptive filter," International Journal of Advanced Scientific Technologies, Engineering, and Management Sciences, 2017.

Murano et al., "Echo cancellation and applications," IEEE Communications Magazine, Jan. 1990.

Gunther, "Learning echo paths during continuous double-talk using semi-blind source separation," IEEE Trans. Audio, Speech, and Language Processing, vol. 20, pp. 646-660, Feb. 2012.

Gunther, "Incorporating signal history into transfer logic for two-path echo cancellers," in Asilomar Conference on Signals, Systems, and Computers, pp. 225-230, Nov. 8, 2015.

* cited by examiner

ECHO CANCELATION USING CONVOLUTIVE BLIND SOURCE SEPARATION

CROSS-REFERENCE TO RELATED APPLICATIONS

This application claims priority to U.S. Provisional Patent Application No. 62/660,115 entitled "ECHO CANCELATION USING CONVOLUTIVE BLIND SOURCE SEPARATION" and filed on Apr. 19, 2018 for Todd Moon, which is incorporated herein by reference.

FIELD

The subject matter disclosed herein relates to echo cancelation using convolutive blind source separation.

BACKGROUND

Acoustic echoes may distort communications where a microphone is near a speaker.

BRIEF SUMMARY

A method for echo cancelation is disclosed. A processor receives audio signals comprising a speaker output and an ambient input. The processor further calculates separated output signals from mixed signals using a separating transfer function. The processor calculates a criterion function based on the separated output signals. In addition, the processor calculates an acoustic echo transfer function based on maximizing the a criterion function. The processor separates a source signal from the audio signal using the acoustic echo transfer function. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
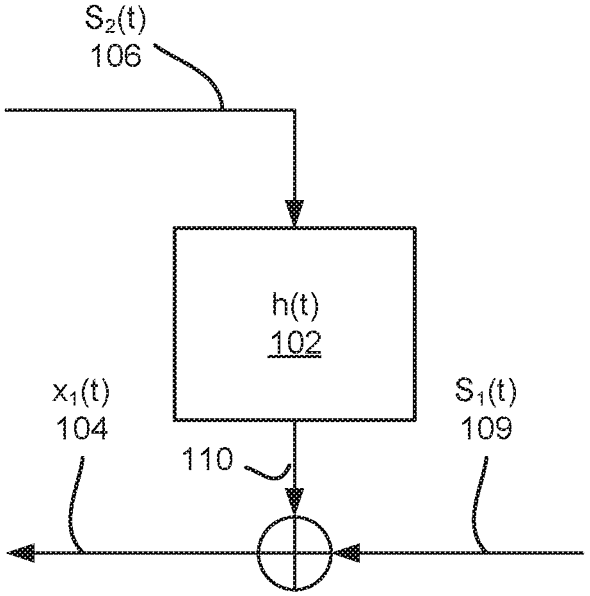
FIG. 1A is a schematic block diagram illustrating acoustic echo.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the “C” programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to “one embodiment,” “an embodiment,” or similar language means that a particular feature, structure, or characteristic described in connection with the embodiment is included in at least one embodiment. Thus, appearances of the phrases “in one embodiment,” “in an embodiment,” and similar language throughout this specification may, but do not necessarily, all refer to the same embodiment, but mean “one or more but not all embodiments” unless expressly specified otherwise. The terms “including,” “comprising,” “having,” and variations thereof mean “including but not limited to,” unless expressly specified otherwise. An enumerated listing of items does not imply that any or all of the items are mutually exclusive, unless expressly specified otherwise. The terms “a,” “an,” and “the” also refer to “one or more” unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Todd K. Moon and Jacob H. Gunther “ACOUSTIC ECHO CANCELLATION DURING DOUBLETALK USING CONVOLUTIVE BLIND SOURCE SEPARATION OF SIGNALS HAVING TEMPORAL DEPENDENCE” is incorporated herein by reference.

The description of elements in each figure may refer to elements of proceeding figures. Like numbers refer to like elements in all figures, including alternate embodiments of like elements.

In audio communication using technology such as a conference phone, a signal emitted from a far end is produced at a speaker at a near end, where it is received by a microphone at a near end, after traversing through the acoustic environment at the near end. This signal is then conveyed by the conference phone (or similar device) back to the far end. The result is that a person speaking at the far end hears their own speech after some delay. This effect is termed acoustic echo. Acoustic echo can arise not only in conference phone settings, but in other settings, such as when an automated "smart speaker" provides a verbal prompt from its speaker, which is then received by its own microphone. The problem may also emerge with smart appliances, such as televisions equipped with voice recognition, in which the appliance's microphone receives not only speech commands, but audio produced by its own speakers as modified by the acoustics of the room the appliance is in.

FIG. 1A illustrates acoustic echo. Acoustic echo is a significant problem in the intelligibility of spoken conversations, and can impair the use of such communication devices. Because of this, there are technologies for dealing with echo cancellation, such as effectively turning off the microphone at a near end when a signal is being produced from a far end. This approach causes difficulties when persons at both end of a conversation attempt to speak at the same time—which happens in many natural conversations, or when a "smart speaker" device is speaking while a person is attempting to speak to it—since one of the speakers is blocked from the conversation by the echo cancellation technology. When two speakers (human or otherwise) attempt to talk at the same time, the problem is referred to as doubletalk.

Technology which can perform echo cancellation even during a doubletalk event would be helpful in making the communication more natural. The embodiments perform echo cancellation during doubletalk using algorithms that can adaptively learn or adjust the acoustic transfer function during doubletalk. The embodiments are based on techniques of convolutive blind source separation. The problem of source separation is to separate different signals which are produced and measured at the same time, such as when multiple persons in a room are talking at the same time. In blind source separation, a separating matrix is used. More specifically, convolutive source separation involves separating signals that have traversed through some kind of transfer function, such as the acoustic effect of passing through a room.

The general approach described here uses a separating transfer function matrix which accounts for transfer functions along the propagating paths. A criterion function measures the quality of separation. By finding parameters which maximize the criterion function, the acoustic transfer function is learned from the measured signals. The method also provides for a method of maximizing that criterion function, such as by gradient ascent.

The physical setting of the echo cancellation is portrayed in FIG. 1A. A far end signal is represented as $s_2(t)$ 106. In this figure, the far end signal 106 may be produced via a remote talker in a conference phone setting, or it may be a signal produced by a "smart speaker", or in other related settings. The far end signal $s_2(t)$ 106 emerges at the near end using a speaker (or equivalent acoustic output device). The far end signal $s_2(t)$ 106 propagates through the local acoustic setting, where it may, for example, reflect from various surfaces and experience delays and attenuations. These acoustic effects 108 are collectively described by an impulse response function h(t). The acoustically modified signal is denoted by $x_2(t)*h(t)$, where $x_2(t)=s_2(t)$ and * denotes the convolution operation. The acoustically modified signal 110 is measured by a microphone at the near end, and the acoustically modified signal 110 is transmitted back to the far end. At the near end there is also an ambient input 109, such as a person talking, that simultaneously produces a signal $s_1(t)$. The return signal $x_1(t)$ 104 containing echo transmitted to the far end from the near end is the sum of the ambient input 109 and the acoustically modified signal 110, $$x_1(t)=s_1(t)+h(t)*s_2(t) \tag{1}$$

This is a mixture of the signals $s_1(t)$ and $s_2(t)$.

Figure 1B:
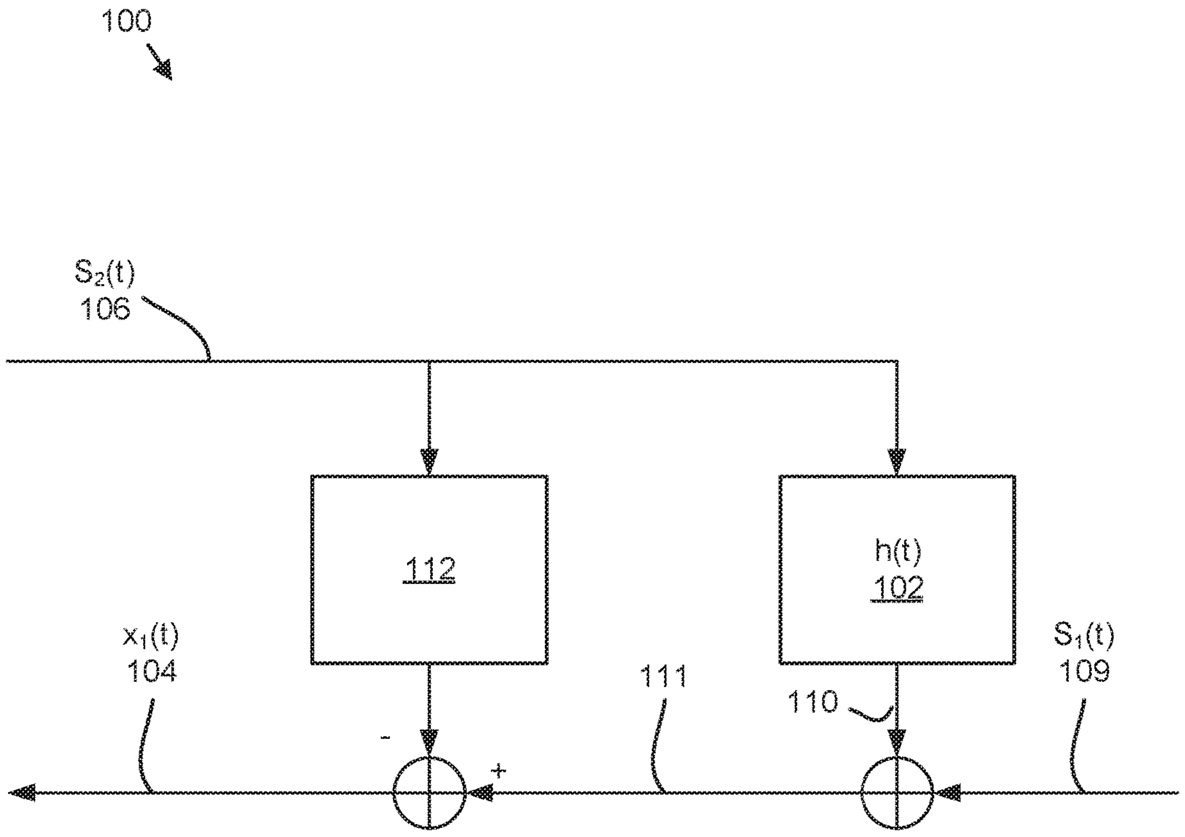
FIG. 1B is a schematic block diagram illustrating one embodiment of an echo cancelation apparatus.

FIG. 1B illustrates removing the echo with an echo cancellation apparatus 100 that cancels the echo from audio signals 111. An estimate of the acoustic impulse response $\hat{h}(t)$ 112 is used within the device to subtract the acoustic echo signal. In this case, when $h_1(t)$ 102 is substantially equal to $\hat{h}(t)$ 112 then $$x_1(t)=s_1(t)+h(t)*s_2(t)-h(t)s_2(t)=s_1(t) \tag{2}$$

Thus, the signal $x_1(t)$ 104 conveyed to the far end is simply the incoming near end signal $s_1(t)$ 109.

The problem of doubletalk echo cancellation is thus to learn h(t) when both the signals $s_2(t)$ and $s_1(t)$ are present at the same time, so that this can be used to provide the echo cancellation.

The problem of echo in the system can be represented as a convolutive mixing problem. The mixture described above, $x_1(t)=s_1(t)+h(t)*s_2(t)$, can be expressed in the notation of Z transforms as $x_1(z)=s_1(z)+h(z)s_2(z)$, where now h(z) and $s_2(z)$ are multiplied. Combining this expression with the other signal $x_2(z)$ gives two equations $$x_1(z)=s_1(z)+h(z)s_2(z)$$

$$x_2(z)=s_z(z), \tag{3}$$

which can be expressed using a matrix/vector notation as $$\begin{bmatrix} x_1(z) \\ x_2(z) \end{bmatrix} = \begin{bmatrix} 1 & h(z) \\ 0 & 1 \end{bmatrix} \begin{bmatrix} s_1(z) \\ s_2(z) \end{bmatrix} \tag{4}$$

The signals $x_1(z)$ and $x_2(z)$ are said to be mixtures of the signals $s_1(z)$ and $s_2(z)$. In this equation, the matrix $$\begin{bmatrix} 1 & h(z) \\ 0 & 1 \end{bmatrix} \tag{5}$$

is said to be the convolutive mixing matrix, where it is convolutive because it contains at least one element, h(z) in this case, which is represented as filter.

The source separation problem is to learn to separate from the measured signals $x_1(z)$ and $x_2(z)$ to produce signals $y_1(z)$ and $y_2(z)$ according to the formula $$\begin{bmatrix} y_1(z) \\ y_2(z) \end{bmatrix} = W(z) \begin{bmatrix} x_1(z) \\ x_2(z) \end{bmatrix} \tag{6}$$

wherein $y_1(z)$ and $y_2(z)$ are substantially similar to $s_1(z)$ and $s_2(z)$. Due the form of the mixing matrix, ideally W(z) would have the form $$W(z) = \begin{bmatrix} 1 & -h(z) \\ 0 & 1 \end{bmatrix} \tag{7}$$

so that learning a separation matrix would involve, as a critical element, learning the filter h(z). This h(z) could be used for echo cancellation.

When the acoustic echo filter h(z) is represented as a finite impulse response (FIR) filter of length $L_M$, then the separating filter W(z) is also an FIR matrix filter of length $L_M$. The separating equation can be written in the time domain as $$\begin{bmatrix} y_1(t) \\ y_2(t) \end{bmatrix} = \sum_{p=0}^{L_M} W_p \begin{bmatrix} x_1(t-p) \\ x_2(t-p) \end{bmatrix} \tag{8}$$

Because of the structure of the mixing problem, each $W_p$ has the particular form $$W_p = \begin{bmatrix} 1 & w_p \\ 0 & 1 \end{bmatrix} \tag{9}$$

To represent the fact that the separating matrix filter W(z) is to be adjusted adaptively from a time signal, the matrix filter at time step t is represented as W(z,t), with component matrices $W_p(t)$, and with an element in the upper right-hand corner $w_p(t)$.

In one embodiment, a separating transfer function W(z,t) is $$W(z,t)=\sum_{p=0}^{Lm} W_p(t) z^{-p} \tag{10}$$

wherein $$W_p(t) = \begin{bmatrix} 1 & w_p(t) \\ 0 & 1 \end{bmatrix}$$

and the output signals are calculated as $$\begin{bmatrix} y_1(t) \\ y_2(t) \end{bmatrix} = \sum_{p=0}^{L_M} W_p(t) \begin{bmatrix} x_1(t-p) \\ x_2(t-p) \end{bmatrix}$$

wherein $L_M+1$ is the number of taps in the acoustic transfer function, and t is time index.

An approach to source separation is to adapt these $W_p(t)$ matrices to the output signals $y_1(t)$ and $y_2(t)$ as statistically independent as possible. This is based on the assumption that the signals $s_1(t)$ and $s_2(t)$ are themselves statistically independent. In addition to the assumption that $s_1(t)$ and $s_2(t)$ are statistically independent, there are different models for the statistical structure within temporal structure of each of the signal $s_1(t)$ and $s_2(t)$. In one embodiment, the elements within $s_1(t)$ at different times t are modeled as being statistically independent, and similarly to the elements of $s_2(t)$. In an embodiment where the elements of $s_i(t)$ are modeled as independent, then a likelihood of $s_i(t)$ may be a generalized Laplacian, $$p_{s_i}(s_i(t))=k\exp(\alpha|s_i(t)|^{\epsilon}) \tag{11}$$

for i=1, 2. The parameters of this model, k, $\alpha$, and $\epsilon$ may be determined, for example, by parameter fitting from training data.

The nature of the statistical structure of the signals may also be represented in a preferred embodiment by representing statistical dependence between instances of $s_1(t)$ and $s_1(t-1)$ and between instances of $s_2(t)$ and $s_2(t-1)$ as first-order Markov random process, that is, $s_1(t)$ and $s_2(t)$ have first-order Markovity. In another embodiment, $s_1(t)$ and $s_2(t)$ can be modeled as Mth-order Markov random processes. In the embodiment where first-order Markovity is employed, a preferred representation of the conditional likelihood $p_{s_i|s_i}(y_i(t)|y_i(t-1))$ (where the subscripts indicate the signal represented by the conditional likelihood, and the arguments of the likelihood indicate the times at which the likelihood is evaluated), and where i=1, 2, is $$p_{s_i|s_i}(y_i(t)|y_i(t-1))=k\exp(\alpha|y_i(t)-y_i(t-1)|^{\epsilon}) \tag{12}$$

This likelihood is a function of the difference between the signal sample at time t and the signal sample at time t−1, $|y_i(t)-y_i(t-1)|$. The parameters of this model, k, $\alpha$, and $\epsilon$, may be determined, for example, by parameter fitting from training data.

In an embodiment when the elements of $s_i(t)$ are modeled as Mth order Markov, the likelihood may be represented as $$p_{s_i|s_i, \ldots}(y_i(t)|y_i(t-1),y_i(t-2)\ldots,s_i(t-M))=k\exp(\alpha|y_i(t)-\sum_{j=1}^{M}\alpha_j y_j(t-j)|^{\epsilon}) \tag{13}$$

The parameters of this model, k, $\alpha$, $\alpha_1, \ldots, \alpha_M$, and $\epsilon$ may be determined, for example, by parameter fitting from training data.

Generally, the likelihood function of $s_i(t)$ with the different assumptions of Markovity (i.e., independence, first-order Markovity, or M-th order Markovity) is denoted as $p_{s_i|---}(y_i(t)|---)$, wherein "-" represent placeholers.

The separating transfer function establishes a criterion function for measuring the statistical independence of the output signals $y_1(t)$ and $y_2(t)$. In a preferred embodiment, a determination of statistical independence may be computed by conformity of the data $x_1(t)$ and $x_2(t)$ to the likelihood function p $(|W_0(t), \ldots, W_{L_M}(t))$, where the likelihood is expressed in terms in which the signal $s_1(t)$ is statistically independent of the signal $s_2(t)$ using various assumptions of statistical dependence among the elements of $s_1(t)$ and among the elements of $s_2(t)$, as described above.

The likelihood function of the signals $(x_1(t), x_2(t))$ can be expressed as a criterion function, wherein "-" represent placeholers, to be maximized with respect to the set of separating filter matrices as $$\phi(W_0(t),W_1(t),\ldots,W_{L_M}(t))=\log|\det(W_0(t))|+\langle\log p_{s_1|---}(y_1(\tau)|---)+\log p_{s_2|---}(y_2(\tau)|---)\rangle_{\tau\in I_t} \tag{14}$$

The notation $\langle\bullet\rangle_{\tau\in I_t}$ denotes an average of times in an interval of time $I_t$ about time t, such as $I_t=(t, t+1, t+2, \ldots, t+N)$, where N is an integer such as N=10. Given the particular nature of the mixing matrix for the echo cancellation problem, $\log|\det(W_0(t))|=0$ for all t, so this criterion function simplifies to $$\phi(W_0(t),W_1(t),\ldots,W_{L_M}(t))=\langle\log p_{s_1|---}(y_1(\tau)|---)+\log p_{s_2|---}(y_2(\tau)|---)\rangle_{\tau\in I_t} \tag{15}$$

In this expression, $y_1(\tau)$ and $y_2(\tau)$ denotes the output of the separating function at time $\tau$, using the separating matrices at time $\tau$:

$$\begin{bmatrix} y_1(\tau) \\ y_2(\tau) \end{bmatrix} = \sum_{p=0}^{L_M} W_p(t) \begin{bmatrix} x_1(t-p) \\ x_2(t-p) \end{bmatrix} \tag{16}$$

The criterion function is optimized with respect to the parameters $w_p$, p=0, 1, ..., $L_M$. This can be done by any optimization algorithm. In one embodiment, gradient ascent is employed, in which coefficients are adjusted according to $$w_p(t+1) = w_p(t) + \mu \frac{\partial}{\partial w_{p(t)}} \phi(W_0(t), W_1(t), \ldots , W_{L_M}(t)) \quad (17)$$

where μ is a gradient ascent step size selected to make the adaptation stable. In an embodiment, a step size of μ=0.001 may be selected, although other values may provide faster convergence. In another embodiment, natural gradient ascent is employed.

Figure 1C:
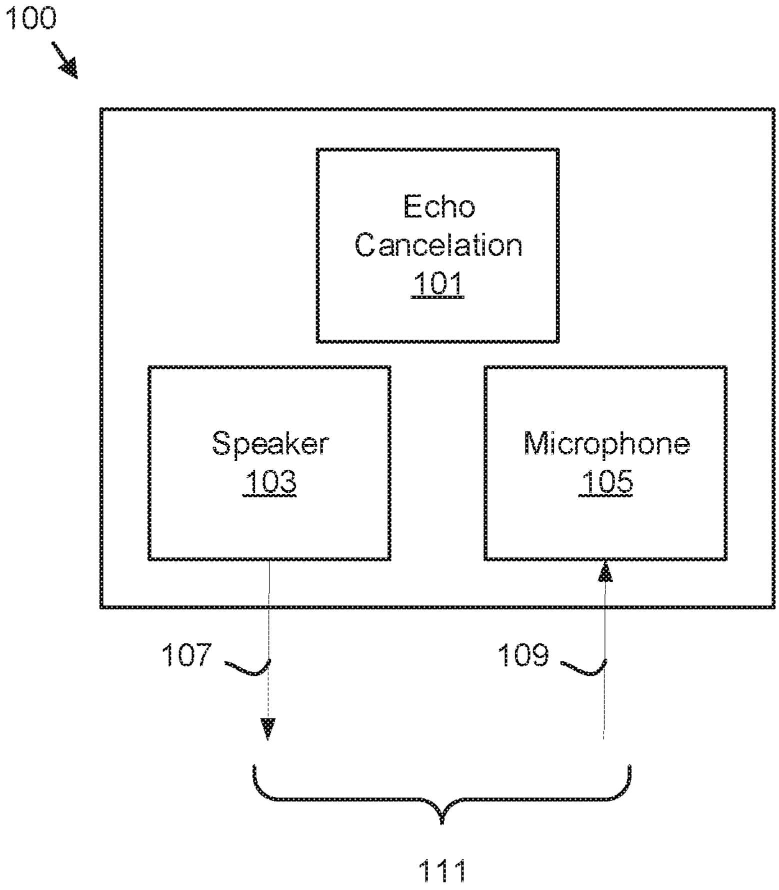
FIG. 1C is a schematic block diagram illustrating one alternate embodiment of an echo cancelation apparatus.

FIG. 1C is a schematic block diagram illustrating the echo cancelation apparatus 100. The apparatus 100 includes an echo cancellation function 101, a speaker 103, and a microphone 105. The speaker 103 may transmit a speaker output 107. The microphone 105 may receive the audio signals 111 comprising the speaker output 107 and the ambient input 109.

Figure 1D:
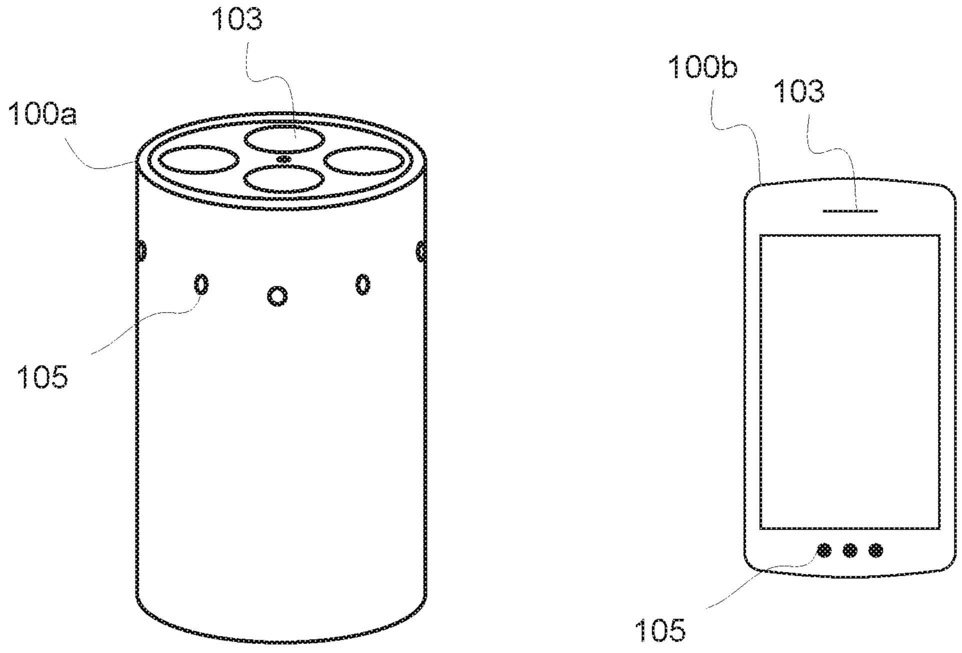
FIG. 1D are drawings illustrating embodiments of echo cancelation apparatuses.

FIG. 1D are drawings illustrating embodiments of echo cancelation apparatuses 100. An audio appliance apparatus 100*a* and a mobile telephone apparatus 100*b* are shown. Each apparatus 100 includes at least one speaker 103 and at least one microphone 105.

Figure 2:
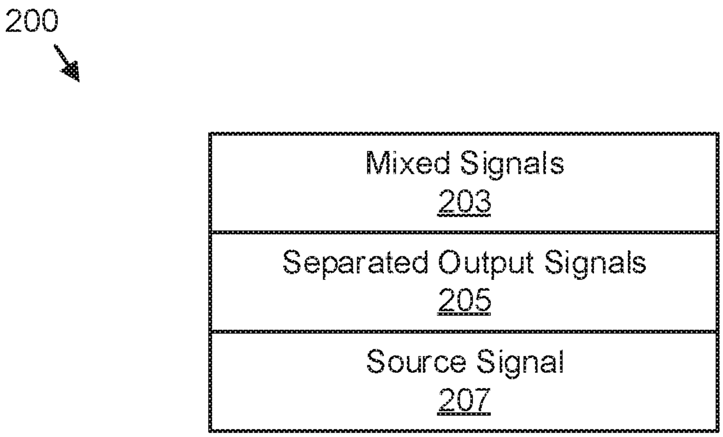
FIG. 2 is a schematic block diagram illustrating one embodiment of echo cancelation data.

FIG. 2 is a schematic block diagram illustrating one embodiment of echo cancelation data 200. The echo cancellation data 200 may be organized as a data structure in a memory. In the depicted embodiment, the echo cancellation data 200 includes mixed signals 203, separated output signals 205, and a single source 207.

Figure 3:
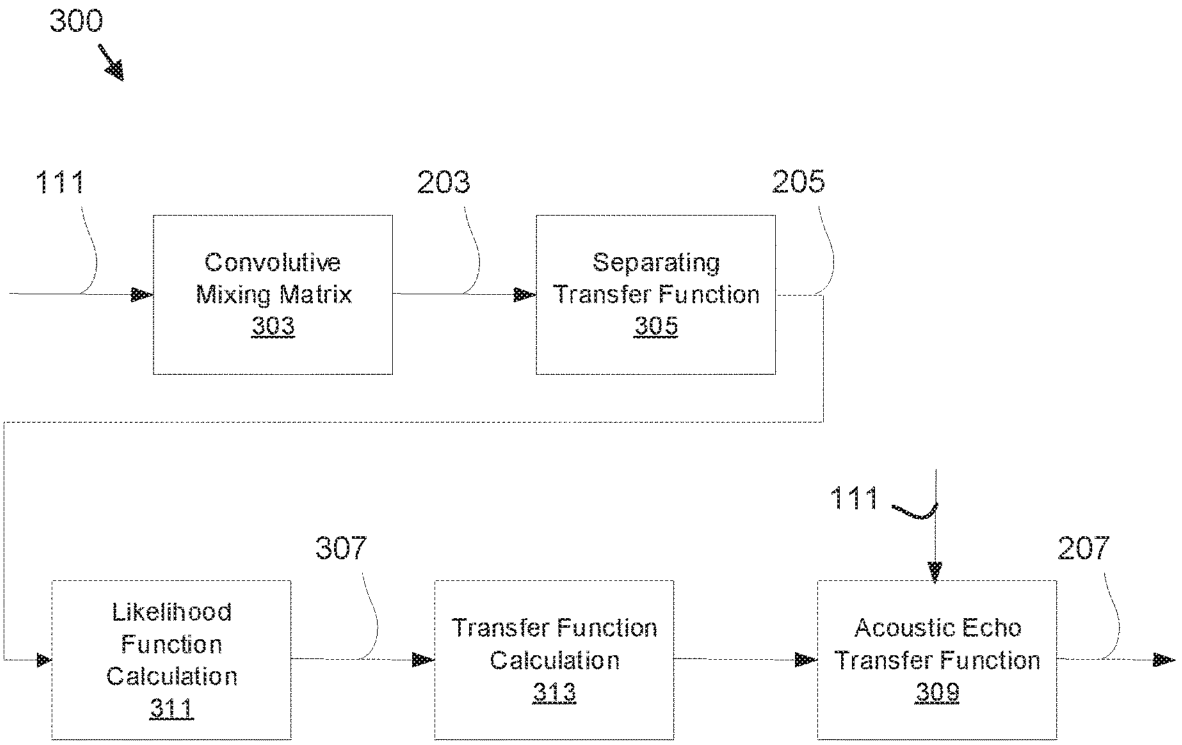
FIG. 3 is a schematic block diagram illustrating one embodiment of an echo cancelation process.

FIG. 3 is a schematic block diagram illustrating one embodiment of an echo cancelation process 300. The process 300 may be performed using data and/or functions that are stored in a memory. In the depicted embodiment, a convoluted mixing matrix 303 receives the audio signals 111 and generates mixed signals 203. A convoluted mixing matrix 303 may comprise Equation 7. The process 300 further calculates separated output signals 205 using a separating transfer function 305. In addition, the process calculates a criterion function 307 based on the separated output signals 205. The process 300 calculates an acoustic echo transfer function 309 based on maximizing the criterion function 307. In addition, the process 300 separates the source signal 207 from the audio signal 111 using the acoustic echo transfer function 309. The separating transfer function 305, criterion function 307, and echo transfer function 309 are described in more detail in FIG. 5.

Figure 4:
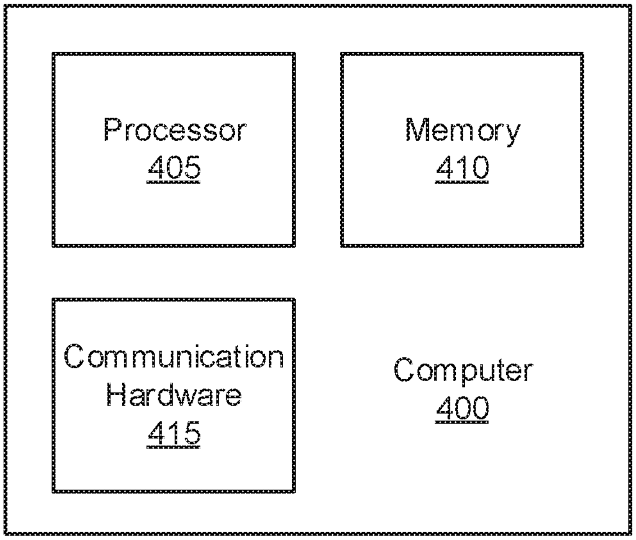
FIG. 4 is a schematic block diagram illustrating one embodiment of a computer.

FIG. 4 is a schematic block diagram illustrating one embodiment of a computer 400. The computer 400 may be embodied in the apparatus 100. In the depicted embodiment, the computer 400 includes a processor 405, a memory 410, and communication hardware 415. The memory 410 may be a semiconductor storage device, hard disk drive, an optical storage device, a micromechanical storage device, or combinations thereof. The memory 410 may store code. The processor 405 may execute the code. The communication hardware 415 may communicate with other devices such as the speaker 103 and/or microphone 105. The communication hardware 415 may further communicate with a far side device. In one embodiment, the echo cancellation function 101 is embodied in the computer 400.

Figure 5:
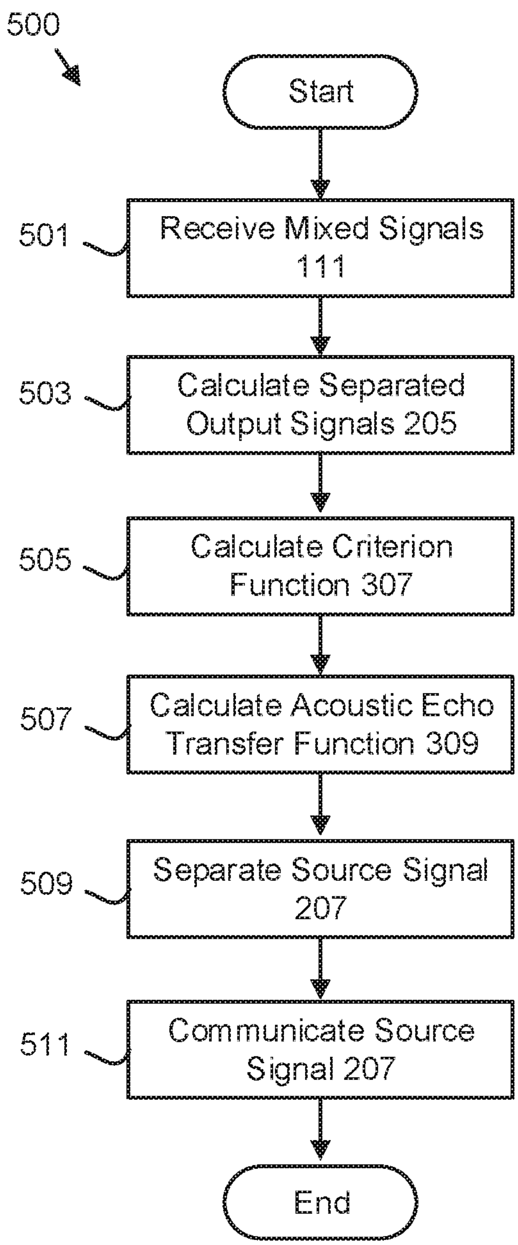
FIG. 5 is a schematic flow chart diagram illustrating one embodiment of an echo cancelation method.

FIG. 5 is a schematic flow chart diagram illustrating one embodiment of an echo cancelation method 500. The method 500 may remove the echo from the audio signal 111. In particular, the method 500 may remove the echo during a doubletalk event. The method 500 may be performed by the computer 400 and/or the processor 405.

The method 500 starts, and in one embodiment, the processor 405 receives 501 the audio signals 111. The audio signals 111 may be received from the speaker 103. The audio signals 111 may comprise the acoustically modified signal 110 and the ambient signal 109. In addition, the audio signals may comprise the speaker output 107 of the far end signal 106.

The processor 405 may calculate 503 the separated output signals 205 from the mixed signals 203 using the separating transfer function 305. The separating transfer function 305 may be equation 10. In one embodiment, the separating transfer function 305 is adjusted adaptively from a time signal and comprises the learning filter h(z). In addition, the output signals 205 may be modeled as statistically independent. In a certain embodiment, the output signals 205 are modeled as the Mth-order Markov random process.

The processor 405 may calculate 505 the criterion function 307 based on the separated output signals 205. The criterion function 307 may express a likelihood function of the separated output signals 205. The criterion function 307 comprise Equation 15.

The processor 405 may further calculate 507 the acoustic echo transfer function 309 based on maximizing the criterion function 307. The criterion function 307 may be maximized using gradient ascent as shown in Equation 17. In addition, the criterion function 307 may be maximized using natural gradient ascent. The use of the criterion function 307 improves the efficiency of the processor 405 and/or computer 400 in removing the acoustic echo from the audio signal 111

The processor 405 further separates 509 the source signal 307 from the audio signal 111 using the acoustic echo transfer function 309. The acoustic echo transfer function 309 may be the inverse of the acoustic impulse response 112 and may be summed with the audio signal 111, removing the acoustic echo. As a result, the acoustic echo is removed from the source signal 307 and the source signal 307 without the acoustic echo may be transmitted to another device.

The processor 405 may further communicate 511 the source signal 207 to another device such as the far end. As a result, the function of the apparatus 100 is improved as the apparatus 100 communicates 511 the source signal 207 with the echo attenuated.

The embodiments efficiently remove the acoustic echo from the audio signal 111, improving the function of the apparatus 100. The use of the criterion function 307 further increases the efficacy of the apparatus 100 and/or computer 400 in removing the acoustic echo and increases the efficiency of the apparatus 100 and/or computer 400 in removing the acoustic echo.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, by use of a processor, audio signals comprising a speaker output and an ambient input;

calculating separated output signals from the audio signals using a separating transfer function, wherein the separated output signals are modeled as an Mth order Markov random process, and the separating transfer function W(z,t) is $W(z,t)=\Sigma_{p=0}^{L_m} W_p(t) z^{-p}$ wherein $$W_p(t) = \begin{bmatrix} 1 & w_p(t) \\ 0 & 1 \end{bmatrix}$$

and the output signals are calculated as $$\begin{bmatrix} y_1(t) \\ y_2(t) \end{bmatrix} = \sum_{p=0}^{L_M} W_p(t) \begin{bmatrix} x_1(t-p) \\ x_2(t-p) \end{bmatrix}$$

wherein $L_M+1$ is the number of taps in the acoustic transfer function, and t is time index;

calculating a criterion function based on the separated output signals;

calculating an acoustic echo transfer function based on maximizing the a criterion function; and separating a source signal from the audio signals using the acoustic echo transfer function.

2. The method of claim 1, wherein the criterion function is maximized using gradient ascent.

3. The method of claim 1, wherein the criterion function is maximized using natural gradient ascent.

4. The method of claim 1, wherein the criterion function is $\phi(W_0(t), W_1(t), \ldots, W_{L_M}(t))$.

5. An apparatus comprising:

a processor;

a memory storing code executable by the processor to perform:

receiving audio signals comprising a speaker output and an ambient input;

calculating separated output signals from the audio signals using a separating transfer function, wherein the separated output signals are modeled as an Mth order Markov random process, and the separating transfer function W(z,t) is $W(z,t)=\Sigma_{p=0}^{L_m} W_p(t) z^{-p}$ wherein $$W_p(t) = \begin{bmatrix} 1 & w_p(t) \\ 0 & 1 \end{bmatrix}$$

and the output signals are calculated as $$\begin{bmatrix} y_1(t) \\ y_2(t) \end{bmatrix} = \sum_{p=0}^{L_M} W_p(t) \begin{bmatrix} x_1(t-p) \\ x_2(t-p) \end{bmatrix}$$

wherein $L_M+1$ is the number of taps in the acoustic transfer function, and t is time index;

calculating a criterion function based on the separated output signals;

calculating an acoustic echo transfer function based on maximizing the a criterion function; and separating a source signal from the audio signals using the acoustic echo transfer function.

6. The apparatus of claim 5, wherein the criterion function is maximized using gradient ascent.

7. The apparatus of claim 5, wherein the criterion function is maximized using natural gradient ascent.

8. The apparatus of claim 5, wherein the criterion function is $\phi(W_0(t), W_1(t), \ldots, W_{L_M}(t))$.

9. A computer program product comprising a non-transitory computer-readable storage medium storing code executable by a processor to perform:

receiving audio signals comprising a speaker output and an ambient input;

calculating separated output signals from the audio signals using a separating transfer function, wherein the separated output signals are modeled as an Mth order Markov random process, and the separating transfer function W(z,t) is $W(z,t)=\Sigma_{p=0}^{L_m} W_p(t) z^{-p}$ wherein $$W_p(t) = \begin{bmatrix} 1 & w_p(t) \\ 0 & 1 \end{bmatrix}$$

and the output signals are calculated as $$\begin{bmatrix} y_1(t) \\ y_2(t) \end{bmatrix} = \sum_{p=0}^{L_M} W_p(t) \begin{bmatrix} x_1(t-p) \\ x_2(t-p) \end{bmatrix}$$

wherein $L_M+1$ is the number of taps in the acoustic transfer function, and t is time index;

calculating a criterion function based on the separated output signals;

calculating an acoustic echo transfer function based on maximizing the a criterion function; and separating a source signal from the audio signals using the acoustic echo transfer function.

10. The computer program product of claim 9, wherein the criterion function is maximized using gradient ascent.

11. The computer program product of claim 9, wherein the criterion function is maximized using natural gradient ascent.

* * * * *